Patented Jan. 10, 1933

1,893,640

UNITED STATES PATENT OFFICE

CHARLES E. F. AHLM, OF CLEVELAND, OHIO, ASSIGNOR, BY MESNE ASSIGNMENTS, TO AUTOMOTIVE RESEARCH CORPORATION, OF WARREN, OHIO, A CORPORATION OF DELAWARE

TRANSMISSION GEARING

Application filed March 21, 1929. Serial No. 348,673.

The primary object of this invention is to provide a compact and efficient automobile gearing mechanism which will afford two quiet driving speeds.

The gearing herein shown is on the order of the gearing shown in my prior application for U. S. Patent, Serial No. 153,544, filed December 9, 1926, and is also similar to the mechanism shown in my prior application filed concurrently with the above as Serial No. 153,545.

In the first mentioned application, I show a three-speed gearing, one of the speeds resulting from directly connecting the driving shaft of the transmission with the driven shaft thereof. This is the highest speed. The speed next below the highest speed is obtained by means of an internal-external gear train, so arranged in the gearing casing that all the elements thereof rotate on permanently fixed axes. One element of the internal-external gearing is arranged to drive a geared countershaft by means of which a third forward speed, still lower than that afforded by the internal-external gearing, may be obtained. A reversing idler arrangement is associated with the countershaft gears.

In my second application above referred to, the countershaft gears are so arranged as to afford an additional low forward speed. In the constructions of both prior applications, the countershaft is driven by means of a gear on the countershaft adapted to mesh with gear teeth formed on one of the elements of the internal-external gear train, so that the countershaft, whenever used, functions in addition to the entire internal-external gear train. I have found that the gearing may be made considerably more compact, may be more efficiently lubricated, and may be more easily controlled if the countershaft is driven through only a part of the internal-external gear train, and the present invention relates particularly to an arrangement whereby the above are accomplished.

The gearing according to this invention has other distinctive advantages, as will hereinafter appear from the following description relating to the accompanying drawings wherein I show my preferred form. The essential characteristics are summarized in the claims.

In the drawings, Fig. 1 is a substantially central longitudinal cross sectional view of the entire gearing; Fig. 2 is a transverse cross sectional view of the gearing taken substantially along the line 2—2 on Fig. 1; Fig. 3 is a detail cross sectional view taken substantially along the line 3—3 on Fig. 2, and Fig. 4 is a perspective view of a bearing spacing and oil collecting sleeve associated with the internal-external gear train.

In general, the gearing shown comprises a main housing or casing 1 adapted to be attached to the motor frame, and forms, in part, a housing for a main clutch of the usual type. The drive shaft, indicated at 10, may be connected with one element of such clutch and has external gear or pinion teeth 11, as well as external clutch teeth 20. The pinion drives a compound gear 12 by reason of engaging internal teeth 13 on this gear. The compound gear has external teeth 14 meshing with internal teeth 15 of a combined gear and clutch sleeve 16. The final driven shaft 17 of the mechanism shown, has a clutch member 18 splined thereon, adapted as by reason of internal clutch teeth 19 to engage the clutch teeth 20 of the driving shaft, and also, by reason of external teeth 21 to engage internal clutch teeth 22 formed on the combined gear and clutch sleeve 16. By the above described arrangement, it will be seen that the shaft 10 may drive the shaft 17 directly, as when clutch elements 19 and 20 coact, and at a reduced speed through the internal and external gears when the clutch teeth 21 and 22 coact.

Intermediate the ends of the compound gear are formed external teeth 25 and these constantly mesh with a gear 26 on a countershaft 27, suitably supported for rotation in the casing below the internal-external gear train, so that the countershaft is constantly driven by the compound gear whenever it turns, the latter being driven at reduced speed from the drive shaft 10 whenever the latter is picked up by the main clutch of the car.

The countershaft has a sliding gear member 28 thereon which has sets of teeth 29 and 30 which mesh with larger sets of gear teeth 31 and 32 respectively, drivingly rigid with the driven shaft 17 of the gearing. When the sliding gear member 28 on the countershaft is out of mesh with both of the gears on the driven shaft, a sliding reversing idler 35 (shown in broken lines) having sets of teeth 37 and 38 may be brought into mesh respectively with the teeth 31 on the driven shaft and teeth 30 on the sliding gear member 28. The reversing idler may be suitably supported in the casing section 41 on brackets, not shown.

The gears 25 and 26 and the gears 30 and 32 are so proportioned with relation to each other that when teeth 30 are caused to mesh with 32, the shaft 17 is driven at a lower speed with relation to shaft 10 than that afforded by the internal-external gears, and when teeth 29 and 31 are brought into mesh, a still lower relative speed is afforded between shafts 10 and 17. This is, in fact, the lowest speed obtainable by the gearing. The reverse speed corresponds to the third forward speed, in considering the angular movement between shafts 10 and 17, since the idler gear 38, as shown, is the same size as the gear 30, and the idler gear 37 corresponds in size to the gear 29.

In detail, the casing, as shown, comprises a forward section 40 which may be joined to a rearward section 41 as along the dividing line 42, there being suitable flanges on both sections for securing the sections together along this line. Built into, that is, forming a part of the casing section 40 is a hollow bracket-like member 45 which forms the main support for the internal-external gear 12. This bracket is supported substantially centrally of the casing by webs 46 and 47 as well as a hollow web formation 48 (see Fig. 2), the webs being joined to the outer wall of the casing section 40. Between the hollow bracket 45 and the sides and bottom of the casing is a partition 49 (see Fig. 1) which forms an additional support for the hollow bracket. The hollow bracket carries a suitable rolling bearing 50 for the drive shaft, which may be held in place against forward movement by a hollow cap 51 suitably secured, in overlying relation to the front end of the hollow bracket 45. The bracket 45 also supports, as in an enlarged cylindrical opening 53, a pair of longitudinally spaced rolling bearings 54 and 55. These bearings support the compound gear 12 in fixed eccentric relation to the shafts 10 and 17. The hollow bracket 45 has an opening on its lowerside as at 56, through which a portion of the gear 26 extends into engagement with the external teeth 25 of the compound gear.

In order to effectively lubricate the internal-external gearing and the bearings thereof, I provide means for conveying oil, picked up by the gear 26 from the bottom of the casing and transferred to the gear 25, first forwardly past the front end of the compound gear member 12, from where it is allowed to flow rearwardly through and along the compound gear to the remaining parts of the internal-external gearing. The arrangement comprises, in part, a pair of bearing spacer rings 60, one at each side of the gear teeth 25. The rings may be pressed onto the compound gear into abutting relation with the gear teeth. These rings 60, in addition to holding the bearings 54 and 55 against shifting toward the gear teeth 25, form shrouds for the gear teeth 25, so that they will retain a considerable quantity of oil. Exteriorly of the gear teeth 25 and inserted in the cylindrical opening 53 of the hollow bracket is an arcuate substantially continuous bearing spacing member 61 formed, as shown in Fig. 4, of a single piece and having suitable ears 62 which are simply bent to overlie the casing parts adjacent the opening 56 to thus hold the spacer in position. The spacer is cut out as at 63 to form an entrance for the gear 26.

The compound gear rotates to the right, as shown in Fig. 2 at all times, assuming the shaft 10 is driven. In order to intercept a portion of the oil thus conveyed upwardly by the teeth 25, I provide a dam-like projection 65 on the member 61 which has downwardly facing openings in one of its sides as at 66. By reason of the dam, a portion of the oil carried up by the teeth 25 is forced through these openings 66 into a pocket or channel 67 (see Figs. 2 and 3) formed in the casing portion 48. The channel 67 leads forwardly to a point between the front end of the compound gear member 12 and the bearing 50, the outlet for the channel at this point being designated 68 in Fig. 3.

A suitable spacing ring 69 (Fig. 1) is held in spaced relation to the front end of the recess 53 as by projections 70 on the bearing sleeve of the bearing 50, which arrangement allows the oil carried forwardly by the channel 67 to spill into the space between the bearing 50 and compound gear from which space this oil flows rearwardly between the cooperating teeth 11 and 13 within the compound gear. Some of the oil, of course, goes to lubricate the bearing 50. Suitable radial channels 72 in the shaft 10 permit a portion of the oil so conveyed to lubricate a pilot bearing 73 interposed between the forward end of the driven shaft 17 and the rear end of the drive shaft, these end parts being shown as telescoping each other. The compound gear has a suitable number of openings 75 (see Fig. 1) which permit other portions of the oil to flow into the space between the combined gear and clutch sleeve 16 and the compound gear. The sleeve 16 is also apertured as at 76, for example, to permit the surplus oil to flow out of the interior of the sleeve 16 back into the oil supply. Obviously, the oil conveyed into the sleeve will lubricate all the clutch teeth 19, 20, 21 and 22. Suitable openings, not shown, may distribute oil from within the sleeve 16 to external bearings 77 for the sleeve.

The bearings 77 for the sleeve 16 are disposed on opposite sides of a rib 16' on the sleeve, and are held in place by suitable retainer rings 78 and 79. The ring 78 is seated between the hollow bracket 45 in the casing section 40, and a hollow bracket 80 formed in the section 41 in substantially abutting relation to the hollow bracket 45. The spaced external bearings for the sleeve 16 provide adequate support for this sleeve, while leaving the same entirely free from the shafts and compound gear to thus permit oil to flow freely through the sleeve to lubricate both sets of clutch teeth.

Because the internal gear and clutch member 16 is not subjected to drag-load from the countershaft, shifting into and out of second, as by means of the clutch member 18, is rendered easy. Obviously, it is considerably easier to mesh and unmesh the teeth 21 and 22 while the vehicle is moving, when there is no additional load on the combined gear and clutch member 16, as in the case of my earlier gearing wherein the countershaft is driven from an element corresponding to this member 16.

Any suitable control device may be provided to condition the gearing for the various speeds, above outlined. As shown, the casing 40 is partially open at its top side and the opening is capped by the housing 85. This housing has a suitable pivotal support 86 for a shift lever 87 which controls the entire gearing. The lower end 88 of the shift lever passes into selective engagement with a plurality of slotted heads, one of which is shown at 89 on suitable sliding control bars 90, 91 and 92. The bar 90 has rigid therewith at its rear end, a shifting fork 94, formed to engage a peripheral groove 98 in the hub of the clutch member 18, so that this clutch may be shifted to its forward position to obtain direct drive between the driving and driven shafts, and to its rearward position to obtain second speed through the internal-external gearing. The bar 91 has rigid therewith a shipper fork 95 which engages a similar peripheral groove 99 in the gear member 98. The bar 92 has a suitable pivotal connection with a rocking lever 96 shown in broken lines in Fig. 1, and which connects, as through a peripheral groove on the reversing idler gear member, also shown in broken lines.

It will be seen that by reason of the fact that the direct connection clutch teeth 20 are located forwardly of the internal gear connection clutch teeth 22, that when in high the clutch member or sleeve 18 is projected forwardly, and when in second, rearwardly. Thus the shift lever 87 which stays in operative contact with the shift bar 90 during the entire shift from high to second, is positioned rearwardly toward the driver's seat for high, and forwardly toward the engine when in second. Third speed may, as will be easily understood, have the usual position of low speed; hence, so far as the usual shifting movements are concerned, for forward driving, the gearing is arranged for standard shifting control movements.

The supports for the countershaft and driven shaft 17 may be of any suitable type. Preferably, the countershaft has internal bearings at 100 which ride on a dead shaft 101 supported at its ends in the partition 49 of the casing section 40, and a suitable boss 102 in the rear wall of the casing section 41. A rolling bearing 105 may be provided in a hollow bracket 106 near the rear end of the casing section 41 to support the rear end of the shaft 17, the shaft 17 having an additional support by reason of the pilot bearing 73, previously mentioned, in the rear end of the shaft 10. The shaft 17 may have, suitably keyed thereto, a flanged coupling member 107 held on by a nut arrangement 108 threaded onto the rear end of the shaft 17, which coupling member is adapted for connection to the propeller shaft of the car leading to the rear axle.

I claim:

1. In a gearing, a casing, a pair of aligned shafts, two hollow sleeve-like gear elements internally and externally geared together and to one of the shafts, said gear elements being positioned, one in eccentric relation to the shafts and the other in concentric relation thereto, means to selectively connect the two shafts directly together and to connect one of the shafts to the concentric geared sleeve, one of said sleeves having external gear teeth formed thereon, a countershaft with a gear thereon meshing with said external teeth, said countershaft having a driving connection to one of said first named shafts and being drivingly connected to the other through the sleeve having said external teeth, and means to lubricate the internal and external gears comprising a recess in the casing leading from a point adjacent said external teeth of such sleeve to a point adjacent one end of this sleeve, there being cooperating means to convey oil from the discharge end of the recess to within the sleeve.

2. In a gearing, a set of sleeve gears internally and externally geared together, shafts having respective driving connections with different elements of the sleeve gears, a countershaft laterally offset from the sleeve gears, and gears thereon with driving connections to both aforesaid shafts, an oil supply for the countershaft gears, the driving connection from the countershaft to one of the aforesaid shafts comprising external gear teeth on one of the sleeves arranged to mesh with one of the countershaft gears, spaced bearings for this sleeve, annular means adjacent the external gear teeth arranged to shroud the external teeth, and means outwardly from the external teeth arranged to cooperate with the shrouds to side-track oil to lubricate the sleeve gears.

3. In a gearing, a casing, a driving and driven shaft supported in the casing, an internal-external gearing comprising a geared element eccentric to the shafts and two geared elements concentric to the shafts, all of said elements being connected by internal and external gear teeth, means for connecting the shafts for direct drive, and for connecting the shafts through all the said geared elements, external gear teeth on the eccentric element, a countershaft having teeth adapted to mesh with said external teeth of the eccentric element, said countershaft having a driving connection to the driven shaft, an oil supply associated with the countershaft, whereby rotational movement of the countershaft conveys oil to said external gear teeth of the eccentric member, and means, including a recess in the casing, arranged to convey oil from said external teeth around one end of the eccentric member and to the interior thereof.

4. In a gearing, a pair of aligned shafts, a casing therefor, two sleeve-like gear members internally and externally geared together and to one of the shafts, one of said members being eccentric to the shafts and the other being concentric therewith, means to connect the shafts directly together and through the intermediacy of said sleeves, a pair of spaced bearings supported by the casing for one of said sleeves, external gear teeth carried by this sleeve between said bearings, a countershaft having an interruptable connection with one of said shafts and a constant connection with the other through said external sleeve teeth, an oil supply in the casing adjacent the countershaft whereby the countershaft conveys oil to said external teeth on the sleeve, and a bearing spacing member in surrounding relation to said external teeth, said spacer having an inwardly extending hollow projection with an opening therethrough, said projection forming a dam whereby oil conveyed by the sleeve teeth is side-tracked, and means to convey the side-tracked oil from said projection into the interior of one of said sleeves.

5. In a gearing, a pair of aligned shafts, a casing therefor, a sleeve-like gear member having an internal-external geared connection to one of the shafts, said sleeve being eccentric to the shafts, means to connect the shafts directly together and through the intermediacy of said sleeve, a pair of spaced bearings supported by the casing for said sleeve, external gear teeth carried by this sleeve between said bearings, a countershaft having an interruptable connection with one of said shafts and a constant connection with the other through said external sleeve teeth, an oil supply in the casing adjacent the countershaft whereby the countershaft conveys oil to said teeth on the sleeve, and a bearing spacing member in surrounding relation to said external teeth, said spacing member having an inwardly extending hollow projection with an opening therethrough, said projection forming a dam whereby oil conveyed by the sleeve teeth is side-tracked, and means to convey the side-tracked oil from said projection into the interior of said sleeve.

In testimony whereof, I hereunto affix my signature.

CHARLES E. F. AHLM.